Nov. 12, 1957 W. SHOCKLEY 2,813,233

SEMICONDUCTIVE DEVICE

Filed July 1, 1954

INVENTOR
W. SHOCKLEY
BY Arthur J. Torsiglieri
ATTORNEY

United States Patent Office 2,813,233

Patented Nov. 12, 1957

2,813,233

SEMICONDUCTIVE DEVICE

William Shockley, Madison, N. J., assignor to Bell Telephone Laboratories, Incorporated, New York, N. Y., a corporation of New York Application July 1, 1954, Serial No. 440,736

12 Claims. (Cl. 317—235)

This invention relates to semiconductive devices.

It has particular application to such devices which include a semiconductive body having a zone of one conductivity type intermediate between a pair of zones of opposite conductivity type. Such a device is now generally described as a junction transistor, the intermediate zone being termed the "base," the two surrounding zones the "emitter" and "collector." In the usual form of a junction transistor a separate electrode ohmic connection is provided to each of the zones. The general principles of junction transistors are described in the Physical Review, vol. 83, pages 151 to 162, in an article entitled "p-n Junction transistors."

A primary object of the present invention is to improve the high frequency characteristics of junction transistors, thereby to increase the upper limit of their operating frequency range.

An important factor limiting the high frequency performance of the usual form of junction transistor is the high base resistance generally associated with transistors otherwise designed for high frequency operation. Since the base resistance is common to both the emitter-base and collector-base branches of the circuit of a junction transistor, a high base resistance makes for instability, especially when the operation is at high frequencies. Although the base resistance of a junction transistor can be lowered by reducing the physical dimensions of the base region, there is a limit beyond which it is impractical and inconvenient to reduce such a dimension.

One expedient that has been employed hitherto to reduce the base resistance and thus to achieve improved high frequency performance is to employ two distinct ohmic connections to the base zone on opposite sides of the semiconductive body between which connections there is applied a steady D.-C. potential bias. It is convenient to designate one such connection as the base electrode and the other as the added electrode. A junction transistor of this kind is now generally described as a tetrode junction transistor. A description of the principles of operation of such a tetrode transistor can be found in the Proceedings of the I. R. E., volume 40, pages 1395 to 1400 in an article entitled "A junction transistor tetrode for high frequency use."

In the operation of a tetrode transistor the emitter and collector electrodes are biased with respect to the base electrode approximately in the same manner as they are in a three-electrode junction transistor. In addition, a potential difference is established between the base electrode and the added electrode to establish a potential gradient along the emitter-base junction. The magnitude and direction of the potential difference maintained between the emitter electrode and the added electrode are adjusted so that the portion of the emitter-base junction which is near the added electrode is biased in the reverse direction and, accordingly, in this region there is no injection of minority charge carriers from the emitter zone to the base zone. In particular, the various operating biases maintained are chosen so that only that portion of the emitter-base junction in the immediate vicinity of the base electrode functions is properly biased for the injection there of minority charge carriers into the base zone. As a result, all the transistor action takes place very near the base electrode with a consequent reduction in the base resistance and an improvement in high frequency performance.

Although such a tetrode transistor has a better high frequency characteristic than a three-electrode transistor of corresponding size, this improvement in the high frequency characteristic is achieved at the expense of an increase in the complexity both of the physical structure of the transistor itself and of its associated circuitry. In particular, the need for the added electrode increases the problem of manufacture since for high frequency applications the base zone to which the added electrode is connected is generally only a fraction of a mil wide. Moreover, many potentially useful forms of junction transistors are not readily adaptable to the addition of another electrode for achieving tetrode action, although the improvement to be expected were such an addition feasible is significant. Typical of such forms is the junction transistor of the kind described in the Proceedings of the I. R. E., volume 41, pages 1702 to 1720, in a series of articles entitled "The surface barrier transistor," where the geometry of its preferred form is such as to make inappreciable the effect on the emitter-base junction which can be realized by connecting two electrodes to the base zone on opposite sides of the semiconductive body as is characteristic of tetrode operation.

Accordingly, a more specific object of the present invention is to realize the advantages brought to junction transistors by the added electrode without actually adding it. A related object is to improve the high frequency characteristics of a three-electrode junction transistor by reducing the base resistance.

A basic feature of the present invention is the use in a junction transistor of a "low lifetime" material for the emitter or the base region, or both, to give rise to a significant recombination current in the emitter-base branch circuit so as to achieve a self-bias along the emitter-base junction. Such regions can be made to have a low lifetime, i. e., a high recombination rate for minority carriers flowing therethrough, by providing therein a high concentration of recombination centers. Typically, recombination centers can be concentrated in such regions by the addition of a suitable impurity, such as nickel or copper when germanium serves as the semiconductive material. By this expedient, a potential gradient is established along the emitter-base junction without need for the added electrode.

In specific embodiments of the invention to be described, a junction transistor designed for high frequency operation is constructed to give rise to a large recombination current in the emitter-base branch circuit by the choice of material of appropriate lifetime for the various constituent zones. Additionally, in accordance with a preferred embodiment, the base electrode extends completely around the semiconductive body in ohmic contact with the base zone. As will be discussed below, a large recombination current in the emitter-base branch circuit results in a self-biasing action which concentrates the transistor action of the emitter-base junction to the vicinity of the base electrode with a consequent reduction in base resistance, which effect is just the end sought by the addition of the extra electrode to the base region in the tetrode transistor. Moreover, the use of a base electrode which extends completely around the surface of the base region increases the region of the transistor which can be used to advantage.

The invention will be more fully understood from the following more detailed description taken in conjunction with the accompanying drawings in which.

Figure 1:
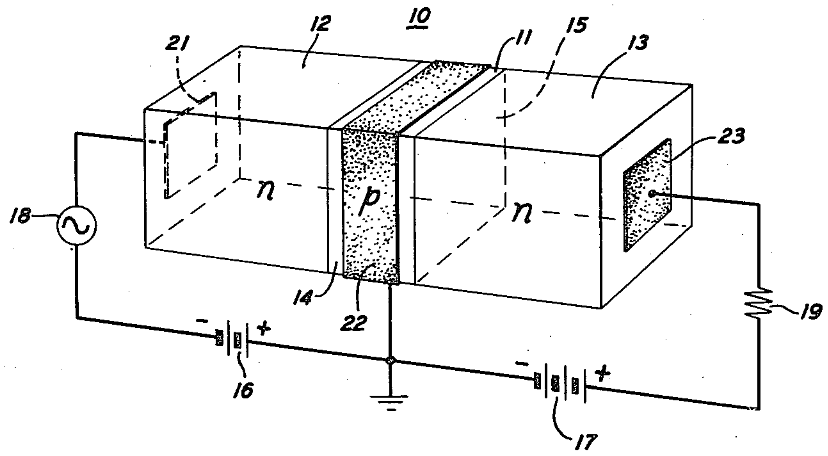
Fig. 1 shows an amplifier which includes a junction transistor which features a low lifetime material in either the emitter or base region in accordance with the invention.

Before describing the invention in greater detail, it will be helpful to review some of the basic principles applicable. In a junction transistor, charge carriers of the kind which predominate in the emitter zone are injected under the influence of the potential difference applied between the emitter and base electrodes across the emitter-base junction and diffuse through the base region to the collector zone where they control the current flowing in the collector-base branch. An important frequency limitation is the transit time it takes injected carriers to diffuse across the base region. The narrower the base region and the shorter the transit time the higher the frequency at which transistor action still occurs.

In diffusing across the base zone, the injected charge carriers being minority carriers tend to recombine with charge carriers of the type predominant in the base zone, setting up current flow in the emitter-base branch but not arriving to the collector zone to set up current in the base-collector branch. The rate of recombination is a function of the number of recombination centers in the base region. It is usual to describe the recombination rate in terms of the lifetime of the material, the lifetime varying inversely with the recombination rate. If $N_0$ is the number of charge carriers per unit volume injected at a time $t=0$ the number of carriers N which will remain uncombined after a time $t=t_1$ is given by the equation $$N=N_0e^{-\nu t_1}$$

where $\nu$ is called the decay constant, the reciprocal of which is known as the "mean lifetime" of the injected carriers. Hitherto, it has generally been regarded as important to make the lifetime of injected carriers in the base region as long as possible to minimize the number of injected carriers that recombine in the base region and so are lost for transistor action. Accordingly, hitherto efforts have continually been directed towards increasing the lifetime of injected carriers in the base region of a junction transistor. It is now the usual practice to employ material having a lifetime at least of the order of tens of microseconds in junction transistors.

Additionally, in the usual form of junction transistor there is utilized for the emitter zone material of high lifetime which reduces the effect on the recombination current of the diffusion of carriers from the base region into the emitter zone.

The present invention represents a departure from this established practice and instead depends on the taking of affirmative action to decrease the lifetime either of the carriers injected from the emitter region into the base region or of the carriers diffusing from the base region into the emitter region. Various techniques can be used to provide regions of low lifetime. For example, suitable impurities can be diffused into such regions from coatings applied thereto. For example, it is known that nickel or copper will decrease the lifetime of germanium and iron that of silicon. Moreover, it is also known that plastic deformation of most semiconductors tends to lower their lifetime characteristics. Similarly, bombardment with high velocity particles tends to reduce the lifetime of most semiconductors.

Fig. 1 shows by way of example an amplifier utilizing a basic form of junction transistor 10 of the n-p-n type. A p-type base region 11 is positioned intermediate n-type emitter and n-type collector zones 12, 13 defining therewith an emitter-base junction 14 and a collector-base junction 15. The emitter-base junction 14 is biased in the forward direction by voltage source 16 connected between the emitter electrode 21 and the base electrode 22, while the collector-base junction 15 is biased in the reverse direction by voltage source 17 connected between the base electrode 22 and the collector electrode 23. A signal source 18 is connected in the emitter-base branch path and a load 19 is connected in the collector-base branch.

In the respects described broadly above, the junction transistor 10 resembles that of the kind now familiar to workers in the art. Various methods will be known to them for forming transistors of this general kind. These include the molten metal alloy process in which appropriate significant impurities are introduced into various parts of a semiconductive body to produce there a desired conductivity type and various techniques which involve changes during the growing of the monocrystalline ingot of semiconductor material from which is carved the wafer which serves as the semiconductive body of the junction transistor. However, several differences characterize the junction transistor 10 from previously known transistors, resulting in improved performance at operation above 50 megacycles.

First, there will be discussed particularly an embodiment in which the base region specifically is characterized by low lifetime material. The same considerations are applicable to the use of such material in the emitter zone, or in both the emitter and base zones. Such material advantageously has a lifetime less than 0.1 microsecond and preferably less than .01 microsecond. These are lifetimes lower than normally found in material intended for use in transistors and special measures are necessary to realize such low lifetimes in material otherwise well suited for transistor use. The collector region instead is advantageously of material having a high lifetime, preferably at least of the order of microseconds.

A transistor having the desired characteristics can, for example, be constructed as follows: First, a suitable additive for decreasing the lifetime, such as nickel, is added along with a suitable acceptor impurity, such as indium, to a germanium melt from which there is grown monocrystalline germanium which is p-type and of low lifetime. Then donor impurities are diffused into opposite ends of a wafer cut from such germanium to effect a conversion in the conductivity type of such end zones to form two spaced p-n junctions which are to serve as the emitter and collector junctions. The p-type region remaining between the two junctions which serves as the base zone is advantageously as narrow as feasible. Advantageously, the donor impurities are injected by the alloy diffusion process since by proper choice of the alloy a change in the lifetime of these end zones can simultaneously be achieved. To this end, the coating applied to the collector end of the wafer is of a lead-antimony alloy, the antimony serving as a donor impurity for converting the conductivity type of the end zones and the lead serving as a getter for absorbing the nickel originally in this end zone and thereby improving its lifetime relative to the base region. In this connection, the segregation characteristics of the various elements are such that at the end region where the various elements have melted together during regrowth the nickel segregates from the n-type germanium zone which solidifies first and is concentrated in the lead rich alloy which solidifies last. However, in forming an electrode connection to the base zone lead and other materials which might tend to drain the nickel from the base region are advantageously avoided. Instead for example rhodium may be plated to the surface to form an ohmic contact.

Moreover, when it is desired to maintain the emitter zone of low lifetime material, the same basic considerations are applicable. However, it is possible nevertheless to utilize a lead-antimony alloy in forming such an emitter zone if enough nickel is added to the alloy to compensate for the tendency of the lead to drain nickel from the germanium. The general principles are otherwise similar to those described in an article entitled "A germanium N–P–N alloy junction transistor," Proceedings of the I. R. E., volume 41, pages 1728–1734.

Various other techniques will be evident to one skilled in the art for achieving the desired design.

The junction transistor 10 differs from the usual form of junction transistor in another respect. To improve the efficiency in accordance with the principles of the invention, it is desirable that the base electrode extend completely around the surface of the base region forming a closed loop therearound in the manner shown.

It is also characteristic that inasmuch as the choice of low lifetime material for the base region results in a degradation of transistor action, a transistor in accordance with the invention will find primary application at frequencies above 50 megacycles where the degradation of tranisistor action is more than compensated for by the reduction in base resistance with consequent improvement in performance. For operation above this frequency, it is important that the base region be no wider than about .3 mil since it is important to limit the time it takes the injected carriers to diffuse across the base region.

Figure 2:
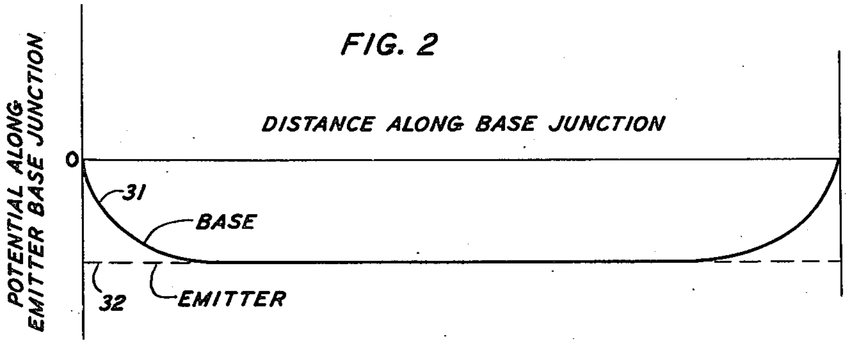
Fig. 2 illustrates the manner in which the potential difference between the base and emitter zones varies across the base region of the transistor shown in Fig. 1.

In Fig. 2, as the solid line 31 there is plotted the D.-C. potential along a path through the base region parallel to the emitter-base junction 14. In this plot, the potential of the base electrode 22, which in Fig. 1 is shown grounded, serves as the zero or reference potential. The D.-C. potential of the emitter electrode 21 which is negative with respect to ground is represented by the dotted line 32. It is to be noted that except at the portions of the base region close to the base electrode 21, the potential of the base region is substantially the potential of the emitter electrode. This is brought about by the flow of recombination current through the emitter-base branch. This flow results in an IR voltage drop along the base region, where I is the recombination current and R the resistance of the base region. Accordingly, with increasing distance from the base electrode, the bias across the emitter-base junction 14 decreases. Inasmuch as transistor action is dependent on a bias across the emitter-base junction, the transistor action is concentrated in regions close to the base electrode with a resultant low base resistance. The depth into the interior where transistor action occurs can be controlled by the lifetime of the material forming the base region which determines the recombination current I.

Accordingly, it can be seen that the use of low lifetime material for the base region results in self-bias of the base region by means of the recombination current flowing through the base. It can be appreciated that this represents a novel approach to the problem of self-bias of a semiconductive zone. Its application can be extended to devices other than the junction transistors being described. For example, the principles may be applied to achieve self-bias in devices such as the field effect transistor.

It can be appreciated further that a similar self-bias effect along the emitter-base junction may be achieved in an alternate fashion by making the emitter zone of low lifetime material. In such a case, the carriers of the type predominant in the base zone which diffuse from the base region into the emitter zone will quickly recombine there. This, too, gives rise to a recombination current which flows in the emitter-base branch circuit. The IR voltage drop associated with this current flow through the base region in this instance, too, gives rise to a potential gradient along the emitter-base junction with distance away from the center of the junction.

A junction transistor of this kind can easily be made, for example, by simply diffusing into the emitter region of a transistor fabricated in the usual way of high lifetime material a suitable additive for reducing the lifetime of the material forming the emitter region.

Moreover, it can be seen that the effects of a low lifetime emitter and a low lifetime base are cumulative so that both effects may be utilized simultaneously.

Figure 3:
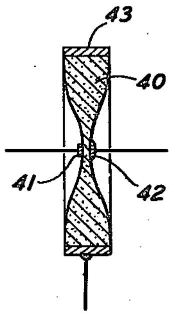
Fig 3 shows a surface barrier transistor which features a low lifetime material in either the emitter or base region in accordance with the invention.

Fig. 3 shows a junction transistor of the geometry described in the aforementioned article. It includes an n-type germanium wafer 40 which is initially about two mils wide and which has a portion of each of its two opposite broad surfaces etched electrolytically to form depressions which reduce the thickness of a wafer to a fraction of a mil at the bottom of the depressions. Then emitter and collector electrodes 41 and 42, respectively, are plated to the wafer at the depressions. The emitter and collector plating material includes p-type impurities to convert the conductivity type of edge portions of the wafer to form emitter and collector junctions therein. A base electrode 43 contacts each of the narrow edge walls of the wafer.

By utilizing initially for the germanium wafer 40 a material of low lifetime and appropriately choosing the plating material for forming the emitter and collector electrodes, for increasing the lifetime of the collector zone by there draining out the additive which serves to reduce the lifetime there is realized a device which is basically the same as that first described in connection with Fig. 1.

Moreover, by obvious modifications it is possible to have only the emitter zone of low lifetime or, alternatively, both the emitter and base zones of low lifetime material.

It is to be understood that the specific embodiments described are merely illustrative of the general principles of the invention. Various other arrangements can be devised by one skilled in the art without departing from the spirit and scope of the present invention. For example, in addition to germanium, silicon and silicon-germanium alloys may serve as the semiconductive material. As mentioned above, iron can be used to lower the lifetime of silicon. Moreover, various alternative techniques may be employed to reduce the lifetime of selected portions of the semiconductive body to the desired low values.

What is claimed is:

1. In a semiconductive device, a semiconductive body having a base zone of one conductivity type intermediate between an emitter zone and a collector zone, contiguous zones being of opposite conductivity type, and characterized in that the collector zone is of a material having a lifetime considerably longer than the lifetime of the material of at least one of the emitter and base zones.

2. In a semiconductive device, a semiconductive body having a base zone of one conductivity type intermediate between an emitter zone and a collector zone, contiguous zones being of opposite conductivity type, and characterized in that the collector zone is of a material having a lifetime at least ten times longer than the lifetime of the material of at least one of the emitter and base zones.

3. In a semiconductive device for operation above 50 megacycles a semiconductive body having a base zone of one conductivity type intermediate between an emitter zone and a collector zone, contiguous zones being of opposite conductivity type, and characterized in that at least one of the emitter and base zones is of a material of a lifetime less than 0.1 microsecond and the collector zone is of a lifetime greater than one microsecond.

4. In a semiconductive device for operation above 50 megacycles a semiconductive body having a base zone of one conductivity type intermediate between an emitter zone and a collector zone, contiguous zones being of opposite conductivity type, and characterized in that the emitter zone is of a material of a lifetime less than 0.1 microsecond and the base and collector zones are of a lifetime greater than one microsecond.

5. In a semiconductive device for operation above 50 megacycles a semiconductive body having a base zone of one conductivity type intermediate between an emitter zone and a collector zone, contiguous zones being of opposite conductivity type, and characterized in that the base zone is of a material of a lifetime less than 0.1 microsecond and the collector zone is of a lifetime greater than one microsecond.

6. In a semiconductive device for operation above 50 megacycles a semiconductive body having a base zone of one conductivity type intermediate between an emitter zone and a collector zone, contiguous zones being of opposite conductivity type, and characterized in that both the emitter and base zones are of a material of a lifetime less than 0.1 microsecond and the collector zone is of a lifetime greater than one microsecond.

7. A semiconductive device according to claim 3 which further includes a separate electrode connection to each of said zones, the electrode connecting to the base zone surrounding said body.

8. In a semiconductive device a germanium semiconductive body having a base zone of one conductivity type and emitter and collector zones of opposite conductivity type, and characterized in that at least one of the base and emitter zones contains enough more nickel than the collector zone to result in the collector zone having a lifetime at least ten times longer than the lifetime therein.

9. In a semiconductive device for operation at frequencies above 50 megacycles a semiconductive body including a base zone of one conductivity type of a width which is a fraction of a mil intermediate between emitter and collector zones of opposite conductivity type, and characterized in that the emitter and base zones are of a material which has a lower lifetime than the material of the collector zone.

10. In a semiconductive device, a semiconductive body having a base zone of one extrinsic conductivity type intermediate between an emitter zone and a collector zone each of opposite extrinsic conductivity type, emitter, base and collector electrodes making connection to each of said extrinsic conductivity type zones, and characterized in that the collector zone is of material having a lifetime at least an order of magnitude longer than the lifetime of the material of at least one of the emitter and base zones.

11. A semiconductive device according to claim 10 which is further characterized in that the base electrode surrounds said body.

12. In a semiconductive device, a semiconductive body having a base zone of one conductivity type intermediate between an emitter zone and a collector zone, contiguous zones being of opposite conductivity type, and characterized in that the collector zone is of material having a lifetime at least ten times longer than the lifetime of the material of at least one of the emitter and base zones and characterized further in that each of said zones has a separate electrode connection thereto, the electrode connecting to the base zone surrounding said body.

References Cited in the file of this patent

UNITED STATES PATENTS 2,623,105 Shockley et al. ---------- Dec. 23, 1952